United States Patent
Preston et al.

(10) Patent No.: US 9,444,110 B2
(45) Date of Patent: Sep. 13, 2016

(54) SYSTEM AND METHOD FOR REDUCING FUEL CELL POWER PLANT EMISSIONS

(75) Inventors: John L. Preston, Hebron, CT (US); Peter F. Foley, Manchester, CT (US); Paul R. Hanrahan, Farmington, CT (US); Joshua D. Isom, South Windsor, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 994 days.

(21) Appl. No.: 13/144,713

(22) PCT Filed: Jan. 15, 2009

(86) PCT No.: PCT/US2009/000265
§ 371 (c)(1),
(2), (4) Date: Jul. 15, 2011

(87) PCT Pub. No.: WO2010/082913
PCT Pub. Date: Jul. 22, 2010

(65) Prior Publication Data
US 2011/0281187 A1    Nov. 17, 2011

(51) Int. Cl.
*H01M 8/04* (2016.01)
*H01M 8/06* (2016.01)
*H01M 2/02* (2006.01)

(52) U.S. Cl.
CPC ..... *H01M 8/04104* (2013.01); *H01M 8/04097* (2013.01); *H01M 8/04201* (2013.01); *H01M 8/04208* (2013.01); *H01M 8/0687* (2013.01); *H01M 2/0242* (2013.01); *Y02E 60/50* (2013.01)

(58) Field of Classification Search
CPC ...... H01M 2/00; H01M 2/02; H01M 2/0242; H01M 2/1016; H01M 2/1094; H01M 2/1211; H01M 2/1217; H01M 2/127; H01M 8/04201; H01M 8/04097; H01M 8/04104
USPC ........................................................ 429/415
See application file for complete search history.

(56) References Cited

U.S. PATENT DOCUMENTS

| | | | |
|---|---|---|---|
| 2002/0106544 A1* | 8/2002 | Noetzel et al. | 429/25 |
| 2003/0198855 A1* | 10/2003 | Walsh et al. | 429/34 |
| 2005/0217673 A1* | 10/2005 | Daly et al. | 128/204.18 |

FOREIGN PATENT DOCUMENTS

| | | |
|---|---|---|
| JP | 2312162 A | 12/1990 |
| JP | 8329967 A | 12/1996 |
| JP | 2002056864 A | 2/2002 |
| JP | 2007323920 A | 12/2007 |

OTHER PUBLICATIONS

The International Search Report and Written Opinion of counterpart foreign application No. PCT/US2009/000265 filed Jan. 15, 2009.

* cited by examiner

*Primary Examiner* — Basia Ridley
*Assistant Examiner* — James Erwin
(74) *Attorney, Agent, or Firm* — Carlson, Gaskey & Olds

(57) ABSTRACT

A system and method for operating fuel cell power plant 10 includes enclosing fuel bearing components, such as fuel cell stack 28 and reformer 24, into a fuel compartment 12 separate from motorized components in a motor compartment 14, and consuming leaked fuel in the fuel compartment 12 using a fuel bearing component such as cell stack 28 and/or burner 26, thereby reducing fuel emissions from the plant.

8 Claims, 1 Drawing Sheet

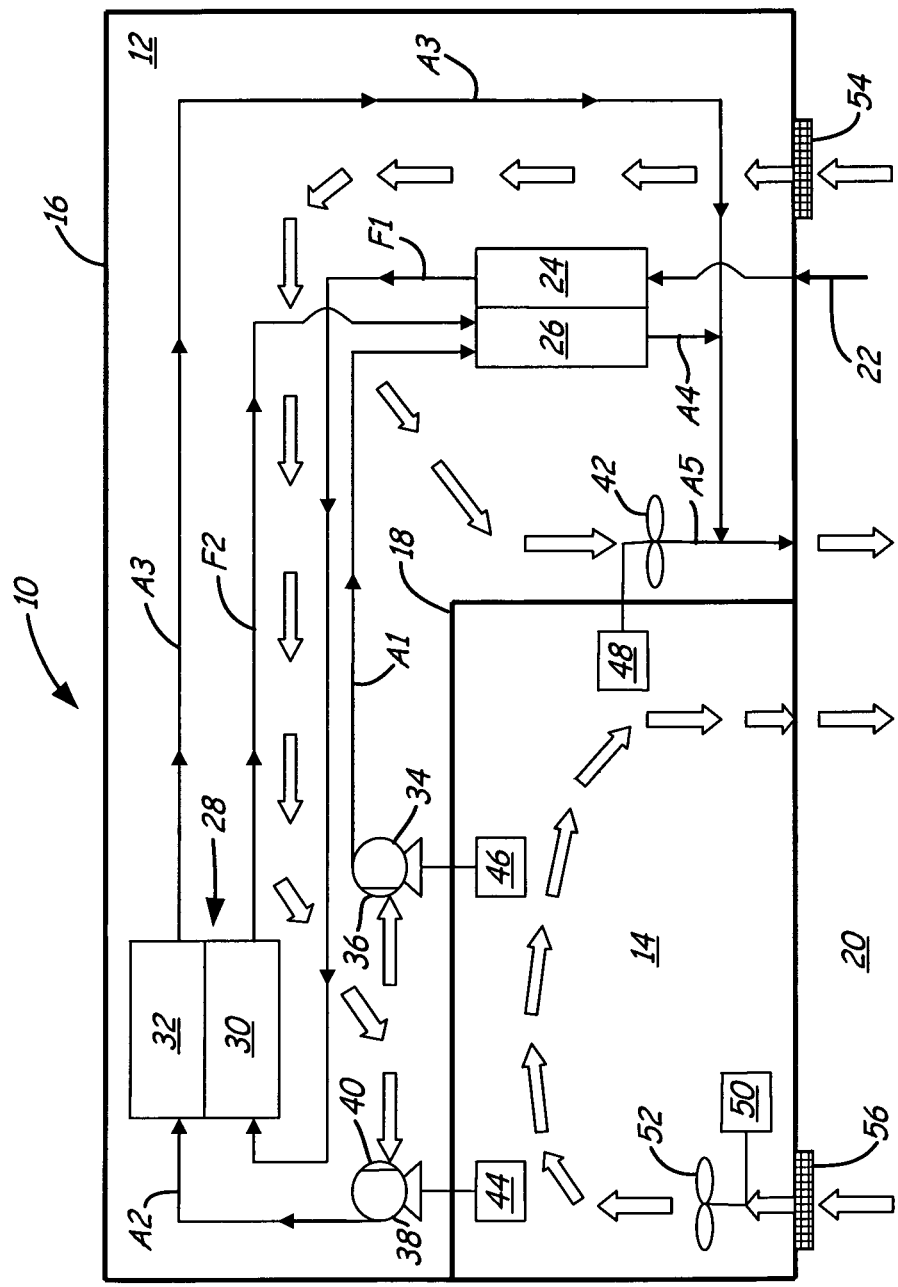

SYSTEM AND METHOD FOR REDUCING FUEL CELL POWER PLANT EMISSIONS

BACKGROUND

The present disclosure relates in general to fuel cell power plants, and more particularly, to a system and method for operating a fuel cell power plant to reduce emissions.

Fuel cell power plants are becoming popular for a variety of applications including stationary power plants. Fuel cell power plants may utilize a reformer for converting a hydrocarbon fuel source into a gaseous hydrogen rich fuel that is fed to a fuel cell along with an oxidant such as air to produce usable electricity and heat via an electrochemical reaction. Multiple fuel cells are typically stacked together in a repeating fashion to form a cell stack assembly ("CSA") for increasing the overall energy output of the power plant. This stacked arrangement requires numerous junctions and manifolds that are sealed for containing and directing fuel through the CSA and other fuel bearing components. Unfortunately, these seals tend to deteriorate over time leading to leakage of fuel into the environment surrounding the fuel cell power plant. Some constituents of the fuel are greenhouse gasses and/or substances which may be harmful for the environment if reaching excessive levels, and it is therefore desirous to minimize their emission for environmental soundness and to meet governmental standards over the entire life of the power plant.

SUMMARY

The present disclosure relates to a system and method for operating a fuel cell power plant by housing a fuel bearing component of the power plant in a compartment into which the fuel bearing component may leak fuel, and producing a flow path in the compartment for providing leaked fuel back into the fuel bearing component for consumption.

BRIEF DESCRIPTION OF THE DRAWINGS

A schematic diagram is shown including embodiments of the present disclosure for a fuel cell power plant.

DETAILED DESCRIPTION

A system and method for operating a fuel cell power plant to reduce emissions includes housing a fuel bearing component, such as a fuel cell stack assembly or burner, for example, in a compartment into which fuel may leak, and producing a flow path in the compartment for providing leaked fuel back into the fuel bearing component for consumption. For example, blowers can be used to provide leaked fuel to a cathode and/or burner, where potentially harmful constituents of leaked fuel including hydrogen, carbon monoxide, and methane will be mostly consumed, thereby significantly reducing the emissions of the power plant and resulting in an increase in operating efficiency as described in more detail below.

Shown in the schematic diagram are fuel cell power plant 10 including fuel compartment 12, motor compartment 14, wall 16, wall 18, ambient air 20, fuel source 22, reformer 24, burner 26, fuel cell stack 28, anode 30, cathode 32, burner air blower 34, burner air blower inlet 36, cathode air blower 38, cathode air blower inlet 40, fuel compartment fan 42, motors 44, 46, 48, and 50, fan 52, fuel compartment air inlet 54, motor compartment air inlet 56. Large arrows depict the general flow of air to and from ambient air 20 and through fuel compartment 12 and motor compartment 14, while smaller arrows represent enclosed flow fields including F1, F2, A1, A2, A3, A4, and A5 for carrying reactants and exhaust.

Fuel cell power plant 10 comprises fuel compartment 12 housing fuel bearing components, and motor compartment 14 housing motorized and electrical components. Fuel cell power plant 10 is enclosed by wall 16, with wall 18 separating fuel compartment 12 from motor compartment 14. Wall 16 functions to separate the enclosed spaces of fuel compartment 12 and motor compartment 14 from ambient air 20 outside of power plant 10. Fuel source 22 is connected to power plant 10 for feeding a hydrocarbon fuel to fuel bearing components in fuel compartment 12. Fuel bearing components may include but are not limited to reformer 24 and burner 26 (which is shown integrated with reformer 24); cell stack assembly 28 comprising multiple fuel cells, each including anode 30 and cathode 32 (only a single anode 30 and cathode 32 shown for convenience); and any plumbing or other physical components associated with flow fields for carrying fuel to and from cell stack assembly 28.

As depicted in the schematic diagram, fuel from fuel source 22 is supplied to reformer 24, where it is processed into a hydrogen rich reactant fuel stream fed to anode 30 via flow field F1. This hydrogen rich fuel stream will typically also contain carbon monoxide, methane, and other trace elements generated from the processing of the fuel, which may include natural gas, diesel, jet fuel, or other hydrocarbon fuels depending on the type of fuel cell utilized. Most of the reactant hydrogen is consumed by the electrochemical reaction of the fuel cells in cell stack 28, however, residual unconsumed hydrogen, along with methane, carbon monoxide, and other unconsumed fuel elements will exit anode 30 to be fed to burner 26 via flow field F2. To assist in combustion of these unconsumed fuel elements, air provided by burner air blower 34 having burner blower inlet 36 is fed to burner 26 via flow field A1.

While fuel is fed to anode 30 of cell stack 28, air containing reactant oxygen is provided to cathode 32 via flow field A2 by cathode air blower 38 having cathode blower inlet 40. Reactant oxygen in the air is consumed by the electrochemical reaction of the fuel cells in cell stack 28, and any unconsumed residual oxygen is exhausted from cathode 32 via flow field A3 along with carbon dioxide, nitrogen, and water vapor. Along with exhaust in flow field A3, exhaust from burner 26 in flow field A4, which should contain almost no reactants such as hydrogen, or harmful traces of carbon monoxide or methane, may join flow field A3 and be expelled from fuel compartment 12 and fuel cell power plant 10 via flow field A5 and the action of fan 42. Flow field A5 may be a conduit, for example, within which fan 42 is positioned.

During operation of fuel cell power plant 10, fuel comprising hydrogen, carbon monoxide, and methane, may leak out of fuel bearing components, especially cell stack 28 with its numerous seals and junctions that tend to deteriorate over time. To prevent potentially combustible mixtures of fuel and oxygen from forming, the air inside fuel compartment 12 may be expelled to ambient air 20, for example, via fan 42. Fan 42 further functions to create a negative pressure inside fuel compartment 12 relative to ambient air 20, helping facilitate a flow of air (depicted by large arrows) from ambient air 20, through air inlet 54 and into the compartment 12 space, thereby diluting the potentially flammable mixture of leaked fuel and air.

Although expelling air from fuel compartment 12 via fan 42 may serve to prevent combustible mixtures of hydrogen from forming in fuel compartment 12, it can be unhealthy for the environment for certain levels of carbon monoxide, methane, and other potentially harmful constituents of leaked fuel to be exhausted along with hydrogen. To alleviate this problem, cathode air blower 38 and burner air blower 34 are positioned inside fuel compartment 12 such that blower inlet 40 and blower inlet 36 are in the vicinity of cell stack 28. This positioning has numerous benefits.

For example, some of the fuel leaked from cell stack 28 and other fuel bearing components into the air contained within fuel compartment 12 will be drawn through blower inlet 40 to be fed by cathode air blower 38 to cathode 32, where leaked fuel constituents including hydrogen and carbon monoxide will be consumed by the electrochemical reaction of the fuel cells of cell stack 28. The levels of leaked hydrogen will typically be small enough that any potential detriment to cell stack 28 will be unnoticeable, such as the possibility of reverse potentials across the fuel cells. Additionally, some of the leaked fuel will be drawn through blower inlet 36 to be fed by burner air blower 34 to burner 26, where leaked fuel constituents including hydrogen, carbon monoxide, and methane will be consumed by combustion. Consequently, exhaust leaving fuel compartment 12 via flow field A5 will contain only trace amounts of methane that was unreacted by cathode 32, and even smaller amounts of carbon monoxide and hydrogen due to consumption by both cathode 32 and burner 26.

Additionally, by positioning cathode air blower 38 and burner air blower 34 such that blower inlet 40 and blower inlet 36 are in the vicinity of cell stack 28, a localized region of negative pressure is created in fuel compartment 12 which creates a cooling air flow path directed past cell stack 28 and other components, for example, reformer 24 and burner 26. It may be appreciated that the general direction of the air flow path can be modified to suit the particular configuration and needs of any fuel cell power plant 10 by changing the location of air inlet 54 in wall 16, as well as the relative position of other inlets, such as blower inlet 40 and blower inlet 36, within fuel compartment 12. Furthermore, it may be appreciated that cathode air blower 38 and burner air blower 34 could be used either alone or in combination to reduce harmful emissions from fuel cell power plant 10 and to generate a cooling air flow path, and that fans, blowers, pumps, or other devices and methods may be used to provide leaked fuel from the space in fuel compartment 12 back into cathode 32 and/or burner 26 for reconsumption.

An additional benefit of using one or both of cathode air blower 38 and burner air blower 36 to create a cooling air flow path in fuel compartment 12 is that air reaching blower inlet 40 and blower inlet 36 will be preheated, thus increasing the heat available from power plant 10 for customer use, e.g., heat provided by a heat exchanger fluidly connected to hot components such as cell stack 28. Furthermore, by feeding heated air to cathode 32, thermal efficiency is increased because the electrochemical reaction requires a certain degree of heat to operate, and because the recapture of leaked fuel for combusting in burner 26 will generate more available heat.

It may also be appreciated that if cathode air blower 38 and/or burner air blower 36 are powerful enough, the need for fan 42 may be eliminated because the blowers will provide not only enough negative pressure inside fuel compartment 12 to keep fresh air flowing into compartment 12 for diluting leaked fuel, but will also generate enough positive pressure to exhaust leaked fuel, most of which has been consumed by cathode 32 and/or burner 26, away from compartment 12 into ambient air 20. By eliminating the need for fan 42, materials cost, weight, and parasitic power draw will be decreased. If fan 42 is used in conjunction with cathode air blower 38 and/or burner air blower 36, the power requirement for fan 42 will decrease and efficiency of power plant 10 will increase.

To further prevent the potential for combustion of flammable mixtures, fuel compartment 12 is separated by wall 18 from motor compartment 14, which houses uninsulated electrical components that may cause sparks, including but not limited to motor 44 for powering cathode air blower 38, motor 46 for powering burner air blower 34, motor 48 for powering fan 42, and motor 50 for powering fan 52. Fan 52 functions to draw air from ambient air 20 through air inlet 56 and into motor compartment 14, generating an air flow path (depicted by large arrows) to keep the motorized components cool, as well as raises the pressure in compartment 14 slightly above ambient and higher than the pressure in fuel compartment 12, thereby hindering any potential encroachment of leaked fuel across wall 18 into compartment 14.

As shown in the schematic diagram, although cathode air blower 38, burner air blower 34, and fan 42 are positioned within fuel compartment 12, motor 44, motor 46, and motor 48 are positioned on the other side of wall 18 in motor compartment 14 for safety reasons. In this arrangement, cathode air blower 38, burner air blower 34, and fan 42 should preferably comprise non-sparking elements, for example, aluminum components. A power shaft or other power transmission device, such as a magnetic coupling, may be used to transmit power from each motor to each blower and fan. By positioning the motors in motor compartment 14 rather than fuel compartment 12, the motors do not need to be made suitable for safe operation in a potentially flammable environment, thereby reducing the cost of the motors.

Furthermore, to prevent the accumulation of particulates such as dust and other debris from ambient air 20 onto components of fuel cell power plant 10 housed in both motor compartment 14 and fuel compartment 12, a filter, such as a coarse air filter may be used at air inlet 56 and/or air inlet 54. Cathode air blower 38 and burner air blower 34 typically require an expensive air microfilter to be used at blower inlet 40 and blower inlet 36. By using a coarse air filter at air inlet 54, the frequency with which the microfilter needs replacing is reduced, thus reducing cost. A coarse air filter can be, for example, a standard commercially available furnace filter.

Although the present invention has been described with reference to preferred embodiments, workers skilled in the art will recognize that changes may be made in form and detail without departing from the spirit and scope of the invention.

The invention claimed is:
1. A fuel cell power plant system comprising:
   a first compartment housing a cell stack assembly, a burner, and air into which fuel can leak;
   a first blower for producing a first flow path in the first compartment that provides the air and leaked fuel into the burner for consumption;
   a second blower for producing a second flow path in the first compartment that provides at least the air into the cell stack assembly; and
   wherein the first blower and the second blower each have an inlet positioned inside the first compartment in a vicinity of the cell stack assembly for creating a cooling air flow path directed past the cell stack assembly.

2. The system of claim 1, wherein the cell stack assembly comprises a cathode, and wherein the air from the second flow path is consumed in the cathode.

3. The system of claim 1, wherein the fuel comprises hydrogen, carbon monoxide, and methane.

4. The system of claim 1, comprising a second compartment, and wherein the first and second blowers each comprise a blower portion in the first compartment and a motor portion in the second compartment.

5. The system of claim 1, wherein each blower comprises a spark-resistant material.

6. The system of claim 1, wherein the first and second blowers produce a negative pressure in the first compartment relative to ambient air outside of the first compartment to hinder leaked fuel from traveling outside of the first compartment.

7. The system of claim 1, wherein the first compartment comprises a wall having an air inlet, and wherein the air inlet comprises a filter to hinder particulates from entering the first compartment.

8. The system of claim 1, comprising a fan for urging air from the first compartment and exhaust from the burner out of the first compartment.

* * * * *